(12) United States Patent
Gesser

(10) Patent No.: US 7,198,431 B2
(45) Date of Patent: Apr. 3, 2007

(54) IRRIGATION SYSTEM AND ASSOCIATED METHODS

(76) Inventor: Hyman D. Gesser, 218 Girton Boulevard, Winnipeg, MB (CA) R3P 0A7

( * ) Notice: Subject to any disclaimer, the term of this patent is extended or adjusted under 35 U.S.C. 154(b) by 0 days.

(21) Appl. No.: 11/126,073

(22) Filed: May 10, 2005

(65) Prior Publication Data

US 2006/0193695 A1    Aug. 31, 2006

Related U.S. Application Data

(60) Provisional application No. 60/569,262, filed on May 10, 2004.

(51) Int. Cl.
*E02B 11/00* (2006.01)
(52) U.S. Cl. .......................................... 405/43; 405/45
(58) Field of Classification Search ............ 405/43–45, 405/36, 37, 39, 40
See application file for complete search history.

(56) References Cited

U.S. PATENT DOCUMENTS

| | | | |
|---|---|---|---|
| 3,939,875 A | | 2/1976 | Osborn et al. |
| 4,142,325 A | * | 3/1979 | Greenbaum ................. 405/45 |
| 4,207,705 A | | 6/1980 | Errede et al. |
| 4,356,665 A | | 11/1982 | de Oliveira |
| 4,740,104 A | * | 4/1988 | Stohr et al. .................... 405/43 |
| 4,916,858 A | | 4/1990 | Hobson |
| 4,993,186 A | | 2/1991 | Immonen |
| 5,099,609 A | | 3/1992 | Yamauchi |
| 5,481,826 A | | 1/1996 | Dickinson et al. |
| 5,622,004 A | | 4/1997 | Gidge |
| RE35,857 E | | 7/1998 | Mehoudar |
| 5,865,377 A | | 2/1999 | DeFrank et al. |
| 5,921,025 A | | 7/1999 | Smith |
| 6,015,102 A | | 1/2000 | Daigle et al. |
| 6,079,156 A | | 6/2000 | Colovic |

(Continued)

FOREIGN PATENT DOCUMENTS

WO    01/001758    1/2001

(Continued)

OTHER PUBLICATIONS

Norikane et al., "Determining the Extractable Water Limit for Wheat in a Substrate-Based Media Designed for Space Flight Applications," *Applied Engineering in Agriculture*, vol. 19, No. 5, pp. 565-569, 2003.

(Continued)

*Primary Examiner*—Frederick L. Lagman
(74) *Attorney, Agent, or Firm*—Allen, Dyer, Doppelt, Milbrath & Gilchrist, P.A.

(57) ABSTRACT

A system and method for efficiently delivering an aqueous solution to plants includes a hydrophilic delivery device, for example, tubing, that has a distal portion positionable adjacent a root system of a plant and a lumen for channeling an aqueous solution from an inlet to the distal portion. At least a portion of the device's wall along the distal portion has a porosity adapted for permitting a flow of the aqueous solution therethrough when acted upon by a surfactant root exudate and/or negative pressure generated by the roots due to water stress. A reservoir is adapted for holding the aqueous solution therein and is situated in fluid communication with the hydrophilic device's inlet.

28 Claims, 2 Drawing Sheets

U.S. PATENT DOCUMENTS

| | | | |
|---|---|---|---|
| 6,182,394 B1 | 2/2001 | Bassler | |
| 6,205,706 B1 | 3/2001 | Buss | |
| 6,226,920 B1 | 5/2001 | Myers | |
| 6,226,921 B1 | 5/2001 | Kang | |
| 6,250,571 B1 | 6/2001 | Cohen | |
| 6,302,338 B1 | 10/2001 | Cohen | |
| 6,308,902 B1 | 10/2001 | Huntley | |
| 6,343,749 B1 | 2/2002 | Thom | |
| 6,357,179 B1 | 3/2002 | Buss | |
| 6,370,820 B1 | 4/2002 | Moss | |
| 6,371,390 B1 | 4/2002 | Cohen | |
| 6,403,012 B1 | 6/2002 | Tomohiro et al. | |
| 6,460,786 B1 | 10/2002 | Roberts | |
| 6,464,816 B1 | 10/2002 | DeFrank et al. | |
| 6,484,439 B1 * | 11/2002 | Tonkin et al. | 47/48.5 |
| 6,561,443 B2 | 5/2003 | Delmer | |
| 6,793,824 B2 * | 9/2004 | Tonkin et al. | 210/640 |

FOREIGN PATENT DOCUMENTS

| | | |
|---|---|---|
| WO | 03/055294 | 7/2003 |

OTHER PUBLICATIONS

Lefsrud et al., "Development of the Microgravity Plant Growth Pocket," *Transactions of the ASAE*, vol. 46, No. 6, pp. 1647-1651, 2003.

Lefsrud, et al., "A Porous Tube Nutrient Delivery System Display for the Edmonton Space and Science Center," An ASAE Meeting Presentation, Paper No: 024073, 6 pages, Jul. 2002.

Microirrigation for a Changing World: Conserving Resources/Preserving the Environment, Proceedings of the Fifth International Microirrigation Congress, 6 pages, Apr. 1995.

Errede, L.A., "Effect of Organic Anion Adsorption on Water Permeability of Microporous Membranes," *Journal of Colloid and Interface Science*, vol. 100, No. 2, pp. 414-422, Aug. 1984.

Errede, L.A., "Effect of Molecular Adsorption on Water Permeability of Microporous Membranes," *Journal of Membrane Science*, vol. 20, pp. 45-61, 1984.

Errede, Louis and Martinucci, Patricia, "Flow Rate of Water through Porous Membranes as Affected by Surface Modification on the Low-Pressure Side of the Membrane," *I&EC Product Research & Development*, vol. 19, No. 4, pp. 573-580, Dec. 1980.

Errede, L.A., "Plant Influence on Water Flow Through Artificial Membranes," *Annals of Botany*, vol. 52, pp. 23-29, 1983.

Errede, L.A., "Correlation of Water Uptake and Root Exudation," *Annals of Botany*, vol. 52, pp. 373-380, 1983.

Errede, L.A., "Studies of Water Uptake from Multiple Sources," *Annals of Botany*, vol. 52, pp. 839-847, 1983.

Solomon, Kenneth H. and Jorgensen, Greg, "Subsurface Drip Irrigation," Research Report, CATI Publication #930405, [online], [retrieved on Oct. 20, 2005], Retrieved from the Center for Irrigation Technology website using Internet <URL: http://cati.csufresno.edu/cit/rese/93/930405>, 1993.

Cooney et al., "A Research Study of the Feasibility of Implementing a Living Wall into the Environmental Studies 2 Building," Research Report, pp. 1-39, 2004.

\* cited by examiner

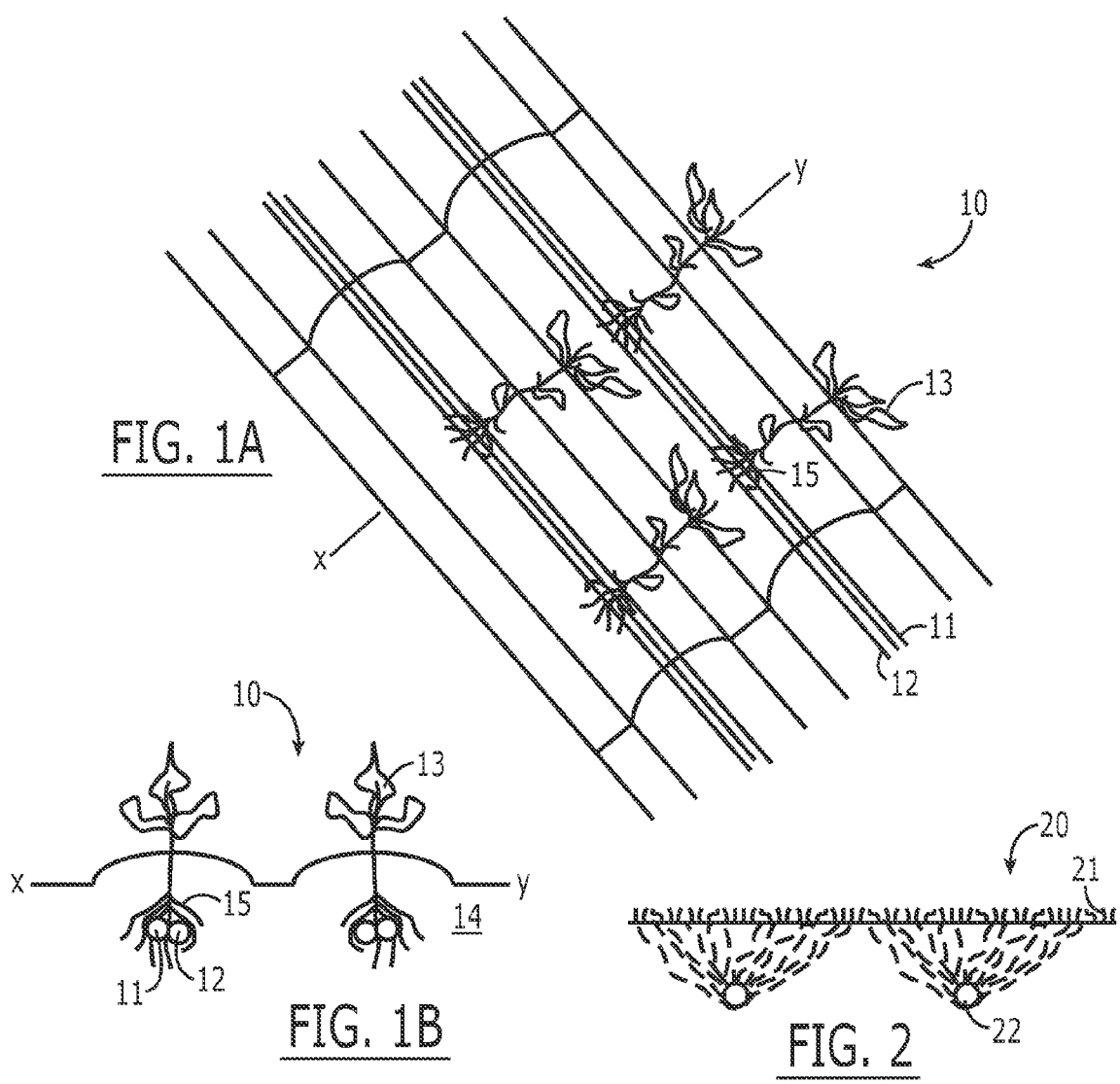
FIG. 1A
FIG. 1B
FIG. 2
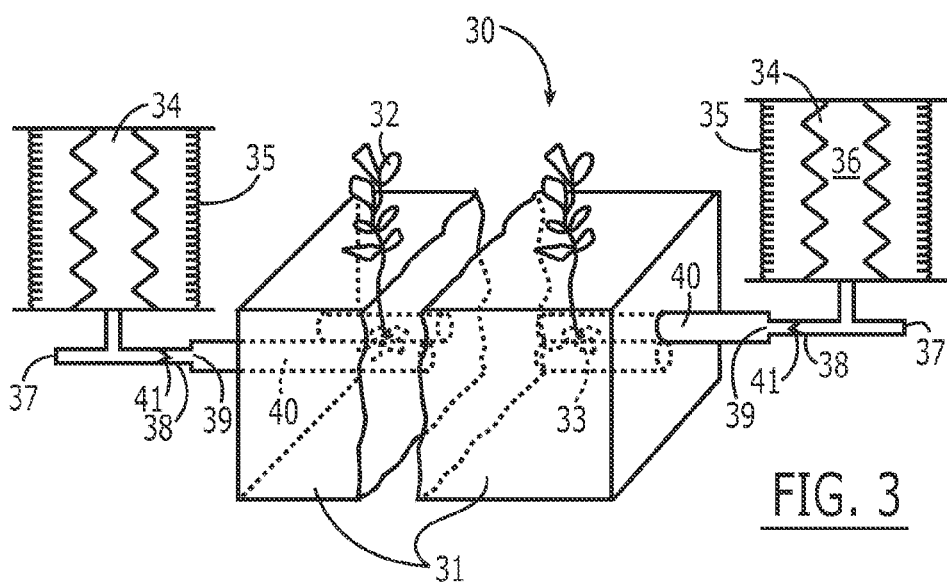
FIG. 3

IRRIGATION SYSTEM AND ASSOCIATED METHODS

CROSS-REFERENCE TO RELATED APPLICATION

This application claims priority to provisional application Ser. No. 60/569,262, filed on May 10, 2004, entitled "Irrigation System," which is incorporated by reference hereinto.

FIELD OF INVENTION

The present invention generally relates to systems and methods for watering and supplying nutrients to plants, and, in particular, to such systems and methods for minimizing water use and maximizing potential crop density.

BACKGROUND

The need for a self-watering system for plants is well established, and many products have been designed and built to satisfy this need to varying degrees. Some systems supply a small continuous amount of water, often referred to as drip irrigation or trickle irrigation, while others rely on the moisture level in the soil to signal the need for water. Still others use wicks that bring water to the plant as a result of surface tension and the capillary rise effect.

Drip irrigation or trickle irrigation is a well-established method of growing crops in arid areas. It is claimed to be 90% efficient in water usage compared to 75–85% for sprinkler systems. The basic drip irrigation system generally consists of a surface tube from which small dripper tubes/emitters are fitted to take water from the supply tube to the roots of the plant on either side of the supply tube. The dripper tube/emitter limits the flow of water to the roots drop by drop based on the viscous resistance to water flow within the emitter/dripper tube. The drip rate is determined by the calculated needs of the specific plants, the soil conditions, anticipated rain fall, and evapotranspiration rate, and can vary from 1 to 4 L/hr per plant.

The need to estimate the water requirements of the crops or the amount of nutrients to be supplied in the water is seldom exact and invariably leads to wastage of water. It was shown that the roots of plants can control the release of water that is stored behind a thin porous hydrophilic membrane that is believed to become hydrophobic due to the adsorption of organic impurities in the water. The mechanism is not fully understood, though it has been speculated that among the root exudates is a surfactant that opens the pores of the membrane that became hydrophobic due the adsorbed organic impurities in water. The hydrophobic membrane inhibits the flow of water to the plants. However, the roots of the plants exude a variety of chemicals that include a surfactant that open the pores of the membrane by making it hydrophilic. Thus water can now flow to the roots and the membrane becomes hydrophobic when the plant has had enough water.

In an alternate mechanism that may be operative, the plant roots in contact with the water/nutrient-filled membrane tube pull water out by virtue of a "negative pressure" effect. Plants and their roots are capable of exerting a "negative pressure" to extract water from their surroundings. The greater the negative pressure exerted by the plant, the more water-stressed the plant becomes. Therefore, the water pressure in the system can be adjusted to match the optimum negative pressure associated with the phenological stage of the plant.

It has also been shown that when two reservoirs (one with water and the other containing nutrient solution) with membranes are presented to a plant, the plant can distinguish between the two sources, taking as much water as it needs and as much nutrients as it requires. The ratio of water to nutrient can vary from 2 to 5 depending on the concentration of the nutrient solution.

Several sub-surface systems have been developed that include tubes that are porous or are perforated to permit the continuous slow release of water. However, these hydrophobic tubes, which require a water pressure of up to two atmospheres, do not automatically stop the delivery of water when the plants have had enough or, for example, when it rains.

One possible reason for the absence of a commercial irrigation system using the membrane system may be the difficulty of obtaining a membrane that can supply the necessary amount of water for new plants or seedlings as well as a fully grown and mature plant that is sprouting and producing fruit and produce. Another possible reason may be the reliance on constant trace amounts of organic solutes in the water, which become adsorbed on the exit walls of the hydrophilic pore channels of the membrane, converting the membrane into a hydrophobic system, which then stops or greatly reduces the flow of water through the membrane. Another reason may be the difficulty of obtaining hydrophilic tubes of suitable wall thickness and diameter that are sufficiently durable to make the process economical.

The Russian SVET space plant growth system consists of a box greenhouse with 1000 $cm^2$ growing area with room for plants up to 40 cm tall. The roots were grown on a natural porous zeolite, with highly purified water keeping the roots at the required moisture level. Zero-gravity growth chambers used by NASA have included a microporous ceramic or stainless steel tube through which water with nutrient is supplied to irrigate the greenhouse plants. Systems using porous ceramic, stainless, or hydrophobic membranes to deliver water and/or nutrients to plants are basically a form of drip irrigation where the water/nutrients are always delivered whether the plants need it or not. As will be apparent to one of skill in the art, the ceramic or stainless tubes are thicker and the organic components are adsorbed onto the full length of the channels and cannot be removed by the plant's exudates.

A popular design element being included in buildings is the so-called "Living Wall," wherein plants are permitting to grow on a building wall. It has been estimated that one square meter of flowers can reduce the air exchange in a building by as much as 25 liters per second, thereby enabling a savings in energy usage via heating and air conditioning.

SUMMARY OF THE INVENTION

The present invention is directed in one aspect to a system for efficiently delivering an aqueous solution to plants. The system comprises hydrophilic means having a distal portion positionable adjacent a root system of a plant. The hydrophilic means have a lumen therethrough for channeling an aqueous solution from an inlet to the distal portion. The hydrophilic means further have a wall encompassing the lumen. At least a portion of the wall along the distal portion has a porosity adapted for permitting a flow of the aqueous solution therethrough when acted upon by a surfactant root exudate or negative pressure generated by the plant roots' experiencing water stress.

The system also comprises a reservoir that is adapted for holding the aqueous solution therein. The reservoir is situated in fluid communication with the hydrophilic means inlet.

The present invention is also directed in another aspect to a method for efficiently delivering an aqueous solution to plants. This aspect of the method comprises the step of positioning a distal portion of hydrophilic means adjacent a root system of a plant as described in the system above. The aqueous solution is introduced into an inlet of the hydrophilic means, and the aqueous solution is channeled from the hydrophilic means inlet to the distal portion.

The present invention is further directed in another aspect to a method for establishing an efficient system for delivering an aqueous solution to plants. This aspect of the method comprises the step of positioning a distal portion of hydrophilic means adjacent a root system of a plant, as described above.

A reservoir for holding the aqueous solution therein is provided, with the reservoir in fluid communication with an inlet of the hydrophilic means. A channel is also provided for establishing a flow of the aqueous solution from the reservoir to the hydrophilic means inlet.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWING

FIGS. 1A and 1B illustrate a dual irrigation tube for supplying water and nutrient to plant roots, in top plan view and cross-sectional view, respectively.

FIG. 2 is a cross-sectional view of a system for irrigating grass.

FIG. 3 illustrates an exemplary system for growing plants that is operable in a gravity-free environment.

DETAILED DESCRIPTION OF THE PREFERRED EMBODIMENT

Figure 4:
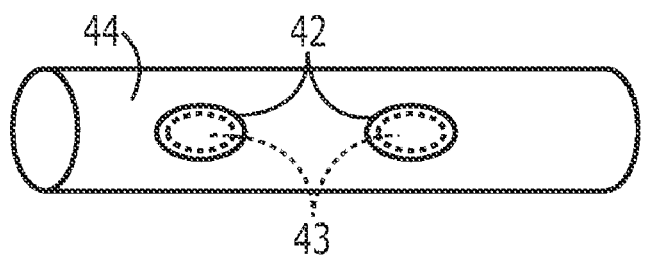
FIG. 4 is a side perspective view of an embodiment of a tube having holes covered with a hydrophilic membrane.

A description of the preferred embodiments of the present invention will now be presented with reference to FIGS. 1–5B.

As used herein, the words "tubes" or "tubing" refer to supply lines for providing water and/or nutrients. As will be appreciated by one of skill in the art, such "tubes" or "tubing" do not necessarily need to be cylindrical, but may be of any suitable shape, and no limitation is intended by the use of these words.

Described herein are a system and method of supplying water and/or nutrients to the roots of growing plants wherein the water and/or nutrients are released to the plants as needed by the individual plants. Although not intended as a limitation on the invention, it is believed that when under water stress, plant roots can generate negative pressure and/or emit exudates or surfactants that promote the release of water and/or nutrients stored under the conditions described below. Specifically, the plants are supplied water and/or nutrients from supply lines or feeder tubes, at least portions of which are hydrophilic.

In some embodiments, the tubing may include a plurality of holes that are covered by hydrophilic membranes; in other embodiments, the entire tubing, the below-surface portion thereof, or a significant portion thereof is hydrophilic. In yet other embodiments, the system may include a surface tube that is water-impermeable or hydrophobic, the tube being connected to a plurality of hydrophilic tubes that can be inserted into a support medium for supplying the roots.

One or more hydrophilic tubes may be inserted into a quantity of support medium such that the tubes are at least partially below the surface of the support media. The support media may be selected from any suitable medium or mixture of media suitable for supporting growing plants and roots. Examples, which are not intended as limitations, of such support media can include sand, soil, Rockwool, polyurethane foam, Fleximat™, and the like. Other suitable media known in the art, such as continuous-fiber growth media, may also be used.

In another embodiment, the plants may be positioned to grow on a substantially vertically oriented surface, for example, a wall, to create a "Living Wall" as discussed above. In this embodiment, the root system is positioned between two fibrous sheets affixed to the wall, and the tubing travels between the sheets adjacent the root system.

In particular embodiments, plants are planted in the support medium and the respective tubes are connected to reservoirs containing water, nutrients, or a mixture thereof. In some embodiments, two tubes may feed a row of plants: a water tube and a nutrient tube. As discussed above, it has previously been shown that the plants are capable of distinguishing between these tubes.

Thin-walled microporous hydrophilic tubes are not known to be commercially available for use as irrigation tubing. In a particular embodiment, hydrophilic materials, including Cell-Force™ and Flexi-Sil™, may be made into hydrophilic tubes. Alternatively, some existing hydrophobic thin-walled tubes can be made hydrophilic by a process that uses a water-insoluble hydrophilic polymer (e.g., polyhydroxy styrene, U.S. Pat. No. 6,045,869, incorporated herein by reference) as a surface coating. Such solutions applied as a coating to microporous hydrophobic plastic tubing have been shown not to clog the pores and to remain hydrophilic for many years. Thus continuous tubes of Tyvek (DuPont-microporous polyethylene) in a radius of 5–10 mm (Irrigro-International Irrigation Systems) have been used after being made hydrophilic and have been shown to act as a membrane that is responsive to the roots of plants in a subsurface irrigation system.

As discussed above, it has been shown that hydrophilic membranes can become hydrophobic over time owing to organic impurities in the water adsorbed into the membrane. Because of the variability of the impurities in water, we have added organic substances to the water which can be adsorbed onto the pore walls, making the membrane hydrophobic, and thereby reducing the flow of water or nutrient solution through the membrane. Examples of suitable organic substances include, but are by no means limited to, humic acid, kerosene, turpentine, pinene, and hexadecane. In other embodiments, other suitable C8–C16 saturated hydrocarbons may be used. The amounts added ranged from 10 ppb to 1 ppm to the irrigating medium. As will be appreciated by one of skill in the art, in some embodiments, the addition of the organic substance may not be essential, depending on the quality of the water.

When growing crops in soil, the addition of nutrient on a continuous basis is not essential; however, when growing crops in sand, Fleximat, or Rockwool, a nutrient solution, for example, any suitable nutrient solution known in the art such as those commonly used in hydroponic systems, e.g., Hoegland Solution, Peter's Solution, or Miracle-Gro, may be added to the water supply or may be fed directly to the plants in a separate tube, as described above, and thus the roots of the plant can be allowed to take as much water and nutrient as required.

FIGS. 1A and 1B illustrate a system 10 that uses twin irrigation tubes 11,12 for delivering water and nutrient solution to plants 13 growing in a growing medium 14. In this embodiment 10, the tubes 11,12 are running through the root systems 15 of the plants 13. It has been found in experiments in both sand and potting soil that the higher the concentration of nutrients used, the smaller the volume of the nutrient solution that is released to the roots 15, which is illustrative of the water conservation achieved by the current invention.

FIG. 2 illustrates a system 20 for the irrigation of grass 21 where the subsurface tubes 22 are spaced 1–2 feet apart and are substantially continuously fed with water under constant pressure, with nutrients added to the aqueous solution as desired.

The irrigation systems and methods described herein are believed superior to any other watering system currently in use, and further are independent of atmospheric pressure. In one embodiment of the invention 30 (FIG. 3), for example, a continuous fiber growth medium 31 such as Rockwool or the spongy Fleximat (from Grow-Tech) can be used to support the plants 32 and their roots 33. In this embodiment 30, both of the reservoirs 34 comprise a container 35 that has an interior space 36 for holding the water and nutrient solution therein. The containers 35 are formed similar to a bellows, and are movable between an expanded state when containing solution and a retracted state when solution has been removed.

The containers 35 also comprise a filling inlet 37 that is in fluid communication with the containers' interior space 36 for adding solution thereto. Distribution tubes 38 are also in fluid communication with the containers' interior spaces 36 and with inlets 39 of the hydrophilic tubes 40. This arrangement provides solution to the tubings' lumina 40. The distribution tubes 38 also have check valves 41 therein for preventing backflow of solution from the tubes 40 toward the containers' interior spaces 36.

Support for plants and their roots can be provided for in the present system under zero gravity, for example, with the use of a monolithic contiguous material such as Rockwool or Fleximat, a spongy hydrophilic porous material made by Grow-Tech. By using these materials to surround twin microporous hydrophilic irrigating tubes, one supplying water while the other supplying a nutrient solution, it is possible to achieve complete conservation of water and nutrients supplied to growing plants. Such a system can also be applied to arid or desert environments where water conservation is desirable.

Early laboratory tests showed that using nutrients in water, it was possible to grow tomatoes in sand with Amerace A10 membranes 42 (50% silica gel in PVC) over holes 43 in a subsurface PVC tube 44 (FIG. 4). The holes 43 in the PVC tube 44 were ½ inch in diameter, which is believed to have limited the amount of water and nutrient available to the growing plant. Increasing the total surface area of the membrane by drilling and covering more holes improved the system. However, a best mode of practicing the invention at the present time favors the use of a continuous tube. Because of the brittle nature of Amerace, membrane tubes made of this material tended to crack and leak.

Tyvek (DuPont) in tube form has been used for irrigation purposes. However, the hydrophobic nature of the polyethylene material permits it to act as a drip source of water for plants without any control by the exudates of the plant roots. The conversion of a hydrophobic surface to hydrophilic has been described (U.S. Pat. No. 6,045,869) and can be used to make Tyvek tubing hydrophilic and responsive to the water and/or nutrient needs of the plant.

The present invention is believed to be the first to provide a plurality of feeding tubes arranged to extend beneath the surface of a support medium to feed a plurality of plants or a row of plants. Furthermore, a clear advantage of tubes comprising a hydrophilic material is that a greater area of the support medium is fed water and nutrients compared to a single horizontal membrane. Additionally, the present system can be operated under negative pressure, relying on the plants' capillary forces to draw solution out of the tubes.

The invention will now be described by way of examples; however, the invention is not intended to be limited by these examples.

EXAMPLE 1

A 4 ft. length of Tyvek tubing (#1053D) was made hydrophilic with an alcoholic solution of polyhydroxystyrene and submerged in a 4.5 ft by 13 cm wide by 10 cm deep planter, covered with soil and connected to a constant supply of nutrient solution at a constant head of 35 cm of water. Ten cherry tomato seedlings were planted at even distances next to the tube where water and nutrients were supplied. Fluorescent lighting was supplied to the plants for 18 hours per day. The average consumption of water was 75±10 mL/hr when the plants were 15 cm high and 125±20 mL/hr when the plants were 25 cm high. When rainfall was simulated by spraying the bed with 100 mL of water, the consumption of water dropped to zero for 2 hours and slowly over the next 3 hours returned to the normal rate. The plants grew to two feet in height, and numerous tomatoes were harvested.

At the end of the experiment, the system was examined to determine if there was any competition between the plants for space on the membrane. An examination of the root system indicated that the roots encircled the membrane only within about 1–2 inches from the plant stem. This indicates that it should be possible to increase the density of plant growth to an extent that would only be limited by the photochemical flux available and mutual interference.

When a dual-tube system was used to supply both water and nutrient separately, the ratio of water consumed to nutrient solution consumed was approximately 2.5 for 8 cherry tomato plants in sand. Again, little or no fluctuations were observed when the size of the plants reached a height of 35 cm.

EXAMPLE 2

Figure 5A:
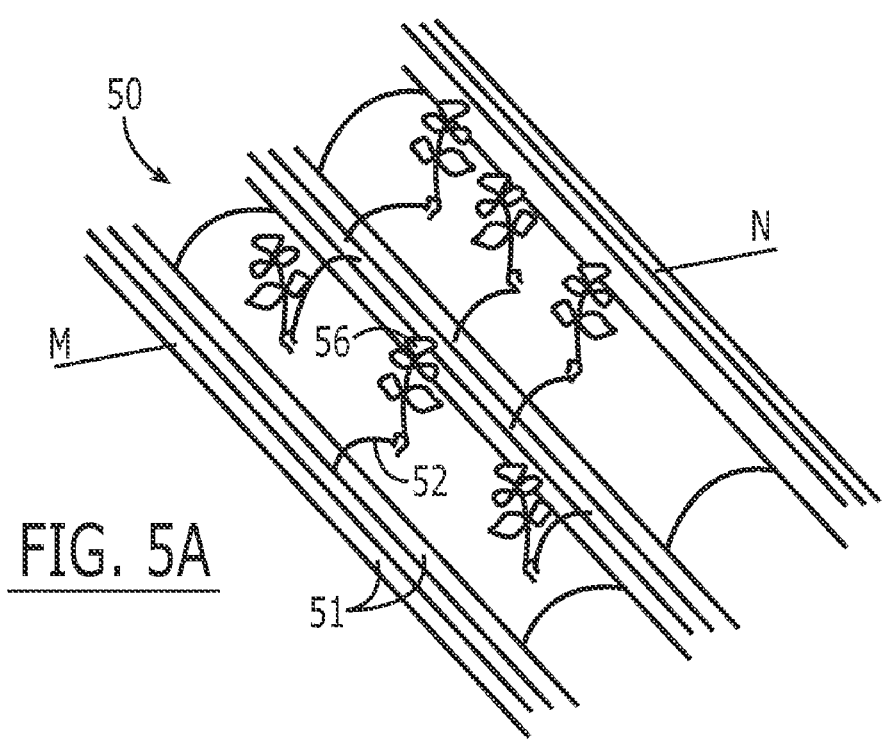
FIGS. 5A and 5B illustrate a growth system that includes both surface and subsurface portions, in top plan view and cross-sectional view, respectively.
Figure 5B:
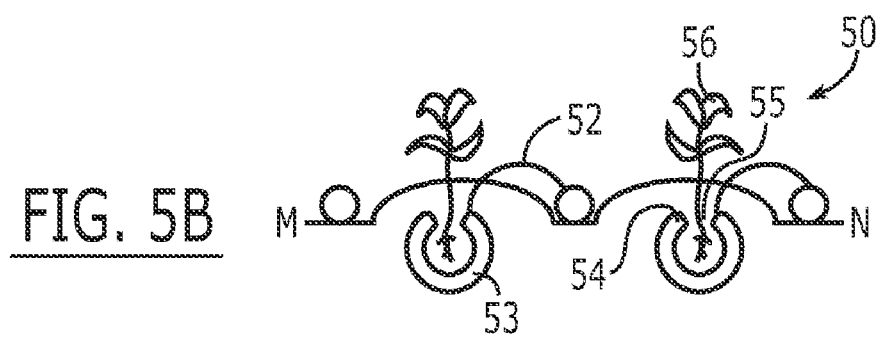

A continuous irrigation tube can be unnecessary for plants such as grape vines or kiwi vines that are spread apart from each other by distances as much as 20 to 40 cm. In these situations 50, it is more practical to use a main flexible surface distributing tube 51 of from 20–30 mm ID, out of which are drawn satellite tubes 52 that feed a short length of from 10 to 30 cm, depending of the size of the vine, of thin-walled microporous hydrophilic irrigating tube 53, closed at its end 54, surrounding the roots 55 of the vine or bush 56, as illustrated in FIGS. 5A and 5B.

EXAMPLE 3

A planter was set up in a greenhouse with a dual-feed membrane tube for water and nutrient through the center of a 15 cm by 15 cm bed, 115 cm long, consisting of 50 cm of Fleximat and 50 cm of Rockwool separated by 15 cm of polyurethane foam. Seeds or seedlings of canola, beans, corn, and tomatoes were planted in each of the three media and their growth patterns observed. Growth proceeded normally, except for the polyurethane foam, with each crop growing at its own rate under a light flux of between 50 and 60 $mW/cm^2$.

EXAMPLE 4

A tomato plant was planted in potting soil, into which was also placed two 20-cm-long microporous hydrophilic tubes of 1 cm radius. The tubes were connected to reservoirs of water and nutrient which were kept full. The soil remained dry while the plant grew to produce numerous tomatoes.

EXAMPLE 5

An experiment was conducted to compare the water use of three potted lettuce plants irrigated using a subsurface membrane system with a control group of three plants receiving an equivalent amount of water by hand-watering on the surface. The comparison illustrated that the plants with the membrane system flourished, while the control group of plants died. This difference may be attributed to evaporative losses from the soil surface of the control plants. Since the soil on the surface of the membrane-watered plants stayed substantially dry throughout the experiment, evaporative loss from the surface in the experimental group of plants was minimal. This example is again illustrative of a feature of the present invention of water conservation.

It will be appreciated by one of skill in the art that plants with varying water requirements can be satisfied by the embodiments of the present invention, wherein one continuous porous hydrophilic irrigating tube is used to allow each plant to take its water requirements independently of the other plants. Such requirements are often needed in greenhouses, where many different plants are cultivated under one roof.

It has also been shown that a hydrophilic irrigation tube with two channels, one for water and the other for nutrients, can fully satisfy the plants' requirements and also increase the density of the plants, limited only by the sunlight available.

It has also been shown that commercially available thin-walled microporous hydrophobic tubes can be converted to hydrophilic tubes and thereby become responsive to plants and their roots.

It has also been shown how a dual membrane tube can be incorporated into a container for one or more plants so that the plants can be fed on demand both water and nutrients from separate reservoirs and thereby require no attention or supervision as long as there is water available in the tube reservoirs, since the plants can extract water and/or nutrient under negative pressure conditions.

It has additionally been shown that water systems that are free of contaminated organic substances and unresponsive in the irrigation system can, by the addition of trace amounts of one or more hydrocarbons to the water supply, become responsive to the irrigation system.

It has also been shown that the irrigation system of the present invention can be used to replace the emitter in a drip irrigation system, thereby making the release of water and/or nutrient responsive to the roots.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A system for efficiently delivering an aqueous solution to plants comprising:
   a hydrophobic tube at least a portion of a surface of which is coated with a substantially water-insoluble hydrophilic polymer, the portion at least along a distal portion, the distal portion positionable adjacent a root system of a plant, the hydrophilic means having a lumen therethrough for channeling an aqueous solution from an inlet to the distal portion, the hydrophilic means further having a wall encompassing the lumen, at least a portion of the wall along the distal portion having a porosity adapted for permitting a flow of the aqueous solution therethrough when acted upon by a surfactant root exudate; and
   a reservoir adapted for holding the aqueous solution therein, the reservoir in fluid communication with the hydrophilic means inlet.

2. The system recited in claim 1, wherein the hydrophilic means comprises tubing comprising at least one region of a microporous hydrophilic material.

3. The system recited in claim 2, wherein the tubing comprises the microporous hydrophilic material throughout a region to be positioned adjacent the plant root system.

4. The system recited in claim 2, wherein the tubing comprises a generally hydrophobic material having a plurality of holes therethrough and a hydrophilic microporous material affixed in covering relation to the holes.

5. The system recited in claim 2, further comprising a generally water-impermeable intermediate tube in fluid communication at a first end with the reservoir and at a second end with the tubing inlet.

6. The system recited in claim 5, wherein the plant root system is positioned below a surface of a growing medium, and wherein at least a portion of the intermediate tube is positioned above the growing medium surface.

7. The system recited in claim 2, wherein the tubing comprises a first tube and the reservoir comprises a first reservoir for holding at least water, and further comprising:
   a second tube having a distal portion positionable adjacent the plant root system, the second tube having a lumen therethrough for channeling a nutrient solution from an inlet to the distal portion, the second tube further having a wall encompassing the lumen, at least a portion of the wall having a porosity adapted for permitting a flow of the nutrient solution therethrough when acted upon by a surfactant root exudate, the second tube comprising at least one region of a microporous hydrophilic material; and a second reservoir for holding the nutrient solution therein, the second reservoir in fluid communication with the second tube inlet.

8. The system recited in claim 1, further comprising a support medium for supporting and growing the plant therein, the hydrophilic distal portion positionable beneath a surface of the support medium.

9. The system recited in claim 8, wherein the support medium comprises a substantially continuous, hydrophilic, porous fiber material.

10. The system recited in claim 1, wherein the polymer comprises polyhydroxy styrene.

11. The system recited in claim 1, wherein the aqueous solution has added thereto an organic substance in a concentration range of 10 ppb to 1 ppm.

12. The system recited in claim 11, wherein the organic substance is selected from a group consisting of humic acid, kerosene, turpentine, pinene, hexadecane, and a C8–C16 saturated hydrocarbon.

13. A system for efficiently delivering an aqueous solution to plants comprising:
hydrophilic means having a distal portion positionable adjacent a root system of a plant, the hydrophilic means having a lumen therethrough for channeling an aqueous solution from an inlet to the distal portion, the hydrophilic means further having a wall encompassing the lumen, at least a portion of the wall along the distal portion having a porosity adapted for permitting a flow of the aqueous solution therethrough when acted upon by a surfactant root exudate; and a reservoir adapted for holding the aqueous solution therein, the reservoir in fluid communication with the hydrophilic means inlet, wherein the reservoir comprises:
a container having an interior space for holding the aqueous solution therein, the container movable between an expanded state when containing solution and a retracted state when solution has been removed;
a filling inlet in fluid communication with the container interior space for adding solution thereto; and
a distribution tube in fluid communication with the container interior space and with the hydrophilic means inlet, for providing solution to the hydrophilic means lumen, the distribution tube having a check valve therein for preventing backflow of solution from the hydrophilic means lumen toward the container interior space.

14. A method for efficiently delivering an aqueous solution to plants comprising the steps of:
coating at least a portion of a hydrophobic tube with a substantially water-insoluble hydrophilic polymer, the portion at least along the distal portion to form a hydrophilic tube;
positioning a distal portion of the hydrophilic tube adjacent a root system of a plant, the hydrophilic tube having a wall encompassing a lumen, at least a portion of the wall along the distal portion having a porosity adapted for permitting a flow of an aqueous solution therethrough when acted upon by a surfactant root exudate;

introducing the aqueous solution into an inlet of the hydrophilic tube; and
channeling the aqueous solution from the hydrophilic tube inlet to the distal portion.

15. The method recited in claim 14, wherein the positioning step comprises positioning tubing comprising at least one region of a microporous hydrophilic material adjacent the plant root system.

16. The method recited in claim 15, wherein the tubing comprises a first tube, and further comprising the steps of:
positioning a distal portion of a second tube adjacent the plant root system, the second tube having a wall encompassing a lumen, at least a portion of the wall having a porosity adapted for permitting a flow of a nutrient solution therethrough when acted upon by a surfactant root exudate, the second tube comprising at least one region of a microporous hydrophilic material; and introducing the nutrient solution into an inlet of the second tube; and
channeling the nutrient solution from the second tube inlet to the second tube distal portion.

17. The method recited in claim 14, wherein the positioning step comprises positioning the hydrophilic distal portion beneath a surface of a support medium adapted for supporting and growing the plant therein.

18. The method recited in claim 14, wherein the polymer comprises polyhydroxy styrene.

19. The method recited in claim 14, further comprising the step of, prior to the introducing step, adding an organic substance to the aqueous solution in a concentration range of 10 ppb to 1 ppm.

20. The system recited in claim 19, wherein the organic substance is selected from a group consisting of humic acid, kerosene, turpentine, pinene, hexadecane and a C8–C16 saturated hydrocarbon.

21. A method for establishing an efficient system for delivering an aqueous solution to plants comprising the steps of:
coating at least a portion of a surface of a hydrorhobic tube with a substantially water-insoluble hydrophilic polymer, the portion at least along a distal portion of the hydrophobic tube, to form a hydrophilic means;
positioning a distal portion of the hydrophilic means adjacent a root system of a plant, the hydrophilic means having a wall encompassing a lumen, at least a portion of the wall along the distal portion having a porosity adapted for permitting a flow of an aqueous solution therethrough when acted upon by a surfactant root exudate;
providing a reservoir for holding the aqueous solution therein, the reservoir in fluid communication with an inlet of the hydrophilic means; and
providing a channel for establishing a flow of the aqueous solution from the reservoir to the hydrophilic means inlet.

22. The method recited in claim 21, wherein the polymer comprises polyhydroxy styrene.

23. The method recited in claim 21, further comprising the step of adding an organic substance to the aqueous solution in the reservoir in a concentration range of 10 ppb to 1 ppm.

24. The system recited in claim 23, wherein the organic substance is selected from a group consisting of humic acid, kerosene, turpentine, pinene, hexadecane, and a C8–C16 saturated hydrocarbon.

25. A method for establishing an efficient system for delivering an aqueous solution to plants comprising the steps of:
  positioning a distal portion of hydrophilic means adjacent a root system of a plant, the hydrophilic means having a wall encompassing a lumen, at least a portion of the wall along the distal portion having a porosity adapted for permitting a flow of an aqueous solution therethrough when acted upon by a surfactant root exudate; and
  providing a reservoir for holding the aqueous solution therein, the reservoir in fluid communication with an inlet of the hydrophilic means, wherein the reservoir comprises:
    a container having an interior space for holding the aqueous solution therein, the container movable between an expanded state when containing solution and a retracted state when solution has been removed;
    a filling inlet in fluid communication with the container interior space for adding solution thereto; and
    a distribution tube in fluid communication with the container interior space and with the hydrophilic means inlet, for providing solution to the hydrophilic means lumen, the distribution tube having a check valve therein for preventing backflow of solution from the hydrophilic means lumen toward the container interior space.

26. A method for efficiently delivering an aqueous solution to plants comprising the steps of:
  positioning a distal portion of hydrophilic means adjacent a root system of a plant, the hydrophilic means having a wall encompassing a lumen, at least a portion of the wall along the distal portion having a porosity adapted for permitting a flow of an aqueous solution therethrough when acted upon by a surfactant root exudate;
  introducing the aqueous solution into an inlet of the hydrophilic means from a reservoir adapted for holding the aqueous solution therein, the reservoir in fluid communication with the hydrophilic means inlet, wherein the reservoir comprises:
    a container having an interior space for holding the aqueous solution therein, the container movable between an expanded state when containing solution and a retracted state when solution has been removed;
    a filling inlet in fluid communication with the container interior space for adding solution thereto; and
    a distribution tube in fluid communication with the container interior space and with the hydrophilic means inlet, for providing solution to the hydrophilic means lumen, the distribution tube having a check valve therein for preventing backflow of solution from the hydrophilic means lumen toward the container interior space; and
  channeling the aqueous solution from the hydrophilic means inlet th rough the distribution tube to the distal portion.

27. A system for efficiently delivering an aqueous solution to plants in a low-gravity environment comprising:
  a reservoir;
  means for adding purified water to the reservoir;
  means for introducing an organic additive to the purified water in the reservoir; and
  a hydrophobic tube at least a portion of a surface of which is coated with a substantially water-insoluble hydrophilic polymer, the portion at least along a distal portion, the distal portion positionable adjacent a root system of a plant, the hydrophilic means having a lumen therethrough for channeling the aqueous solution from an inlet in fluid communication with the reservoir to the distal portion, the hydrophilic means further having a wall encompassing the lumen, at least a portion of the wall along the distal portion having a porosity adapted for permitting a flow of the aqueous solution therethrough when acted upon by a surfactant root exudate.

28. The system recited in claim 27, wherein the organic additive is selected from a group consisting of a C-8 to C-14 hydrocarbon and kerosene.

* * * * *